(12) United States Patent
Kearns

(10) Patent No.: US 6,237,966 B1
(45) Date of Patent: May 29, 2001

(54) CO-EXTRUDED DUAL DUROMETER HARDNESS PIPE GASKET

(75) Inventor: Thomas P. Kearns, Bonne Terre, MO (US)

(73) Assignee: Bidco Plastic Extrusion, Inc., Park Hills, MO (US)

( * ) Notice: Subject to any disclaimer, the term of this patent is extended or adjusted under 35 U.S.C. 154(b) by 0 days.

(21) Appl. No.: 09/109,500

(22) Filed: Jul. 2, 1998

(51) Int. Cl.[7] .................................................. F16L 49/00
(52) U.S. Cl. ........................ 285/230; 292/231; 277/625; 277/944
(58) Field of Search ....................... 285/910, 230, 285/231, 374; 277/625, 626, 641, 650, 944

(56) References Cited

U.S. PATENT DOCUMENTS

| | | | |
|---|---|---|---|
| 2,116,705 | * 5/1938 | Marx et al. | 285/374 |
| 4,182,519 | * 1/1980 | Wilson | 285/230 |
| 4,223,896 | * 9/1980 | Strom | 285/230 |
| 4,261,583 | * 4/1981 | DeVries et al. | 110/346 |
| 4,305,595 | * 12/1981 | Miyagishima et al. | 277/625 |
| 4,381,273 | 4/1983 | Azzola . | |
| 4,429,886 | * 2/1984 | Buttner | 277/606 |
| 4,468,367 | * 8/1984 | Beune et al. | 285/110 |
| 4,558,875 | * 12/1985 | Yamaji et al. | 219/485 |
| 4,617,220 | 10/1986 | Ginster . | |
| 4,834,398 | * 5/1989 | Guzowski | 285/110 |
| 5,001,865 | 3/1991 | Procton . | |
| 5,054,241 | 10/1991 | Mishima et al. . | |
| 5,124,189 | 6/1992 | Arima . | |
| 5,169,161 | * 12/1992 | Jones | 285/110 |
| 5,213,339 | * 5/1993 | Walworth | 277/944 |
| 5,306,021 | * 4/1994 | Morvant | 277/584 |
| 5,460,619 | 10/1995 | Esrock . | |
| 5,584,152 | 12/1996 | Baerveldt . | |
| 5,687,976 | 11/1997 | Andrick et al. . | |

FOREIGN PATENT DOCUMENTS

| 852633 | * 9/1970 | (CA) | 285/230 |
|---|---|---|---|
| 1412085 | * 8/1965 | (FR) | 285/230 |

* cited by examiner

Primary Examiner—Teri Pham Luu
(74) Attorney, Agent, or Firm—Howell & Haferkamp, L.C.

(57) ABSTRACT

A pipe joint is formed using a gasket made of coextruded materials of different durometer hardnesses. The gasket includes a relatively soft, thermoplastic elasomeric sealing portion joined to a harder, plastic substrate on one side of the substrate, usually on the outer circumference of the substrate. The substrate may include stiffening regions axially spaced apart from one another and on opposite axial sides of the softer material. The inner circumference of the gasket (if the softer sealing portion is on the outer circumference) may have annular ridges spaced axially from one another to engage shoulders in one of the pipes of the joint to limit axial displacement of the gasket. The gasket, because of its relatively hard substrate, will not collapse into a groove in the pipe defined by the shoulders, thereby reducing the amount of gasket material required by a typical recess joint. The annular ridges may be coextruded of the same material used for the elastomeric sealing portion, allowing both sides of the gasket to form a seal, thus also permitting the gasket to be useful in single offset joints.

23 Claims, 2 Drawing Sheets

CO-EXTRUDED DUAL DUROMETER HARDNESS PIPE GASKET

BACKGROUND OF THE INVENTION

1. Field of the Invention

This invention relates generally to pipe joints having flexible fluid-type seals.

2. Description of Related Art

Storm and sanitary sewer pipes are generally made of plastic, metal, concrete, or other suitable materials fabricated in configurations and sizes to meet particular requirements or specifications. It is known in the art to form grooves or provide recesses in ribbed or corrugated types of pipe. Spigots (i.e., male pipe sections) are the dominant method performed for manufacturing sewer pipe, although grooves can be formed in bells (i.e., female pipe sections). Resilient seals are typically provided by polymeric gasket elements. O-ring type gaskets are one type of resilient seal that is frequently employed. An O-ring can be mounted on the spigot and then the spigot pushed into the bell.

It is known in the art that O-rings may distort non-uniformly, resulting in weak seals or voids through which liquids can flow. Thus, spigots are often provided with a circumferential groove or a single or double offset shoulder to keep the O-ring from rolling as the pipes are interconnected. Nevertheless, if the diameter of the O-ring and its radial cross-section are greater than the depth of the groove or shoulder, the ring may still roll over the inside edge of the groove, become snagged, or shear off segments of the O-ring as the spigot enters the bell. Various gasket profiles have been used or suggested to overcome these deficiencies.

One conventional pipe joint has an outer pipe and an inner pipe inserted into the outer pipe wherein one of the outer and inner pipe comprises an annular groove. A gasket is positioned within the annular groove and is adapted to provide a seal between the outer pipe and the inner pipe. The gasket comprises an annular gasket body of resilient material. A protrusion extending radially away from the gasket body is located on the gasket body and is bisected by a centerline thereof. An annular bore extends through in the gasket body. The gasket is used between a first pipe and a second pipe, and is placed with its body essentially filling a U-shaped groove in one of the pipes. A number of compression points are provided that are in contact with respective surfaces of the first pipe and the second pipe, including surfaces of the groove. When compressed, a sealing contact is established between a first compression point and an inner surface of the pipe not having the groove, and sealing contacts are established via contact of several additional compression points with the walls of the groove. Thus, except for a small aperture through the base of the gasket, it is the case both before and after compression that the gasket essentially completely fills a groove in one of the pipes.

In view of the large number of pipe joints that may be installed in a typical sewer system, conventional gaskets require more gasket material then is economical. In addition, because their requires them to essentially fill a groove to function properly, such gaskets are impracticable for use in pipe joints in which suitable grooves are not provided.

SUMMARY OF THE INVENTION

It would be advantageous to provide a pipe joint and gasket with a grooved pipe in which the groove holds the gasket in place but is essentially void of gasket material, thus reducing the cost of the gasket without compromising its sealing function. It would further be advantageous to provide a grooved pipe joint having a gasket that is also suitable for use with pipe joints not employing discrete grooves, thus reducing the number of types of gaskets required in inventory when both grooved and ungrooved pipe joints are required.

It is an object of the present invention to provide a gasket that provides a sealing function, yet does so without requiring as much gasket material as is needed with prior art gaskets.

It is yet a further object of the present invention to provide a pipe joint having a co-extruded gasket.

It is another object of the present invention to provide an improved pipe joint having a pipe section with a groove for holding a gasket in place, yet having a gasket that provides a sealing function with less gasket material than prior art gaskets.

It is still another object of the present invention to provide an improved pipe joint that requires substantially reduced gasket material from that required by comparable prior art pipe joints.

It is yet another object of the present invention to provide a pipe joint having a groove for a gasket, but employing a gasket that can be fitted to pipe joints without grooves, so that an inventory of gaskets can be reduced from that which might otherwise be required.

It is still another object of the present invention to provide a method of making a pipe joint in which one of the pipe joints has a groove for a gasket, wherein the method requires substantially less gasket material that is required by comparable methods of making pipe joints.

It is yet another object of the present invention to provide a method of making a pipe joint in which one of the pipes has a groove for a gasket the method using a gasket that may be used in joints with or without grooves, so that an inventory of gaskets may be reduced.

According to the present invention, there is therefore provided a pipe joint comprising: a first pipe section; a second pipe section operatively connected to the first pipe section; a gasket sealingly engaging the first pipe section and the second pipe section for resisting fluid leakage therebetween, the gasket having a first portion having a first durometer hardness and a second portion having a second durometer hardness, the first durometer hardness being different from the second durometer hardness. Advantageously, the first portion and the second portion of the gasket may be co-extruded, and the first portion made of a relatively soft, thermoplastic elastomer material. The first portion of the gasket can comprise an annular tongue affixed to an annular substrate of a relatively harder, plastic material. Preferably, the substrate comprises an inward-facing portion relative to the tongue of the gasket, with the tongue extending in an outward radial direction from the substrate. The substrate may have stiffening ribs on either side of the affixed tongue, and ridges on a side of the substrate opposite the tongue to hold the gasket in a groove of one of the pipe sections without filling the groove. The ridges may comprise a portion of a softer material than the substrate, and may comprise a material of the same composition as the tongue. This softer material allows the gasket to be used in applications where no groove is present by having the ridges themselves form a seal with a surface of a pipe section.

Also in accordance with the invention, there is provided a method of sealing a pipe joint, the pipe joint comprising a first pipe section and a second pipe section, the method comprising: co-extruding a first material and a second material to form a co-extrusion having a first portion of a first durometer hardness and a second portion of a second durometer hardness; forming a gasket from the co-extrusion; and sealingly engaging the pipes with the gasket. The co-extrusion step may advantageously comprise co-extruding a thermoplastic elastomer as the first material, and a second material such as polypropylene, the first material being relatively softer than the second material. The co-extrusion step may advantageously co-extrude a tongue as the first portion and a substrate as the second portion. Stiffening ribs generally on opposite sides of the tongue may be formed in the substrate in the co-extrusion step. Also, a plurality of ridges may also be co-extruded on a side of the substrate opposite to that of the tongue, and a recess in a groove in one of the pipe sections may be bridged without filling the groove. The ridges may be formed of the same material as the softer, first portion and co-extruded therewith.

The manner of realizing each of the objects of the invention will become apparent to one skilled in the art upon review of the accompanying figures and detailed explanation appearing herewith.

DESCRIPTION OF THE PREFERRED EMBODIMENT(S)

Figure 1:
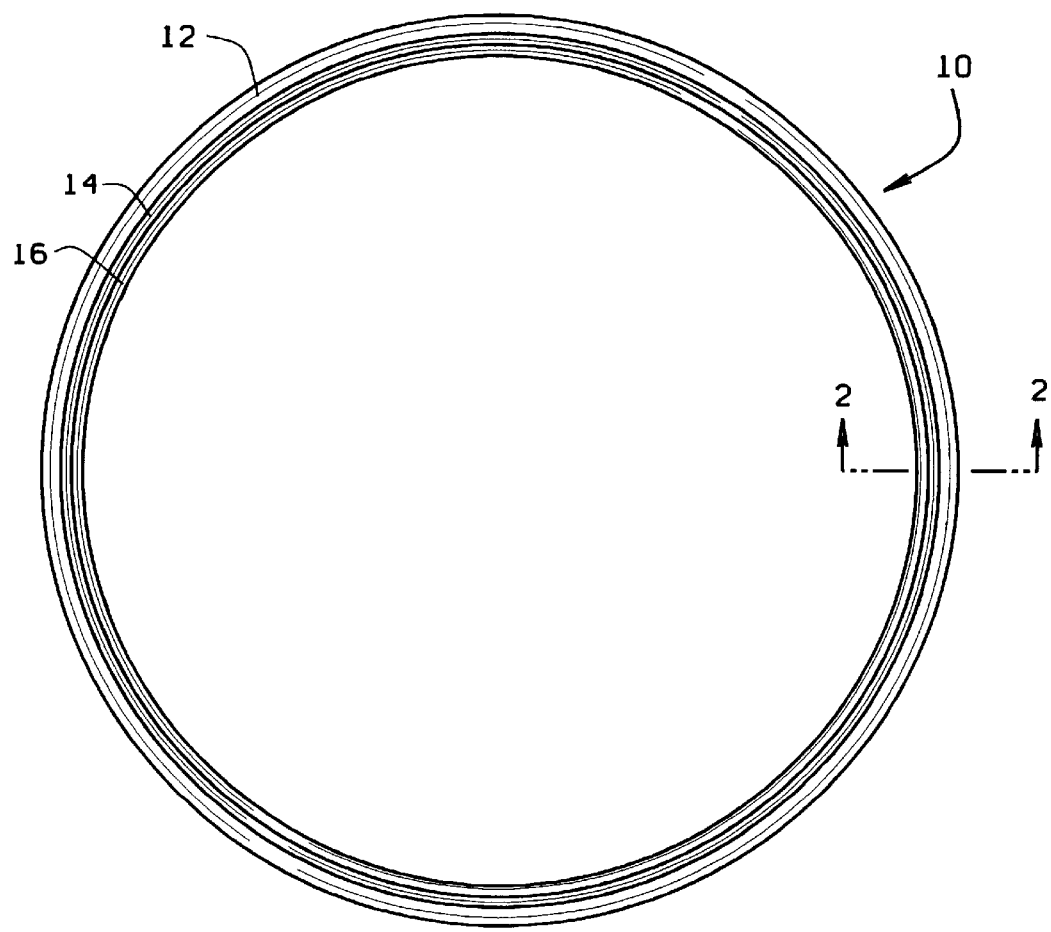
FIG. 1 is a top plan view of a co-extruded gasket of the present invention.
Figure 2:
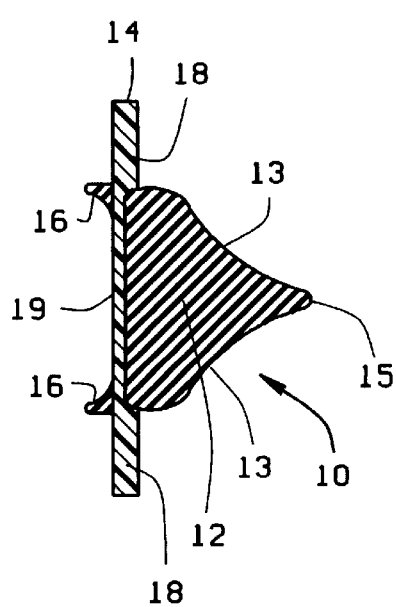
FIG. 2 is a top plan view taken along the plane of line 2—2 of FIG. 1.

FIG. 1 and FIG. 2 show a gasket 10 of the present invention. Gasket 10 comprises at least two portions. An annular first portion or annular tongue 12 is made of a relatively soft material such as an extrudable, thermoplastic elastomer. A second portion or substrate 14 is made of a relatively harder material such as polypropylene plastic. Both the first and second materials should be sufficiently flexible so that after having been co-extruded and cut into the desired length, they can be bent to the desired radius and the ends welded to form an annular gasket 10 as illustrated in FIG. 1.

Suitable materials that may be used for the first portion elastomer include SANTOPRENE® 111-45, a black, thermoplastic, commercial-grade elastomer that is a mixture of EPDM (Ethylene Propylene Diene Monomer) and polypropylene (and thus, compatible with a polypropylene substrate) having a hardness of 45 Shore A, a specific gravity of 0.96, and a compression set of 22 hours (typical value 25, the values for this material being favorable for recovery from stress or compression), available from Advanced Elastomer Systems, Akron, Ohio. Another suitable material for the first portion elastomer available from the same source is SANTOPRENE® 101-55, which has a hardness of 55 Shore A, but otherwise is similar in composition to SANTOPRENE® 111-45. Use of either SANTOPRENE® material in the invention will allow it to meet ASTM standard F-477 for elastomeric seals (gasket) for joining plastic pipe.

Generally, it has been found that gasket materials having durometer hardnesses less than 40 Shore A have insufficient mass and rebound and will not provide an adequate seal for storm and sanitary sewer pipes in frost or cold weather. On the other hand, it has been found, in general, that hardnesses greater than 70 Shore A are too hard to form a proper gasket seal. Therefore, the softer material preferably has an ASTM hardness of about 40 to about 70 Shore A, and more preferably about 40 to about 60 Shore A, and even more preferably about 45±5 Shore A.

The relatively harder portion, on the other hand, should be made of a harder, rigid plastic. Polypropylene or polyvinyl chloride (PVC) are two examples of suitable plastics that may be used for this portion. Generally, polypropylene is preferred because of its lower cost. For reasons that will become apparent, the harder portion should be somewhat stiff and resistant to compression. Polyethylene is regarded as less suitable for the harder portion because of its greater compressibility than polypropylene and polyvinyl. The second portion 14, which forms a substrate for the gasket, would thus have to be made too thick for most applications to achieve important objects of the invention, at least if polyethylene is used by itself as the harder material.

Typically, substrate 14 comprises a thin layer of material upon which the softer annular tongue portion 12 is affixed as part of the co-extrusion process. Substrate 14 may be 0.030" thick in a typical application. With this thickness and a substrate 14 of polypropylene, gasket diameters of 12.5" can readily be formed. Gaskets having larger diameters (e.g., 30–36") can, if desired, be co-extruded with heavier, thicker substrates than those prepared for smaller diameter gaskets.

Referring to FIG. 1 and FIG. 2, softer tongue portion 12 is co-extruded on one side of substrate 14 and affixed thereto. A preferred shape of tongue 12 is generally pyramidal-shaped, with outer walls 13 having a concave portion adjacent to tip 15, although other shapes capable of sealing engagement may be used. Also preferably, substrate 14 may comprise stiffening portions 18 generally disposed on either side of tongue 12. These stiffening portions 18 in substrate 14 may be formed by relatively thicker portions 18 of substrate 14 as compared to a section 19 of substrate 14 to which tongue 12 is affixed, or they may comprise an additional stiffer, co-extruded material.

Annular ridges 16 axially spaced from one another are formed on an opposite side of substrate 14 from which the first softer tongue portion 12 is disposed. Annular ridges or ribs 16 may be made of a relatively soft material, preferably identical to that material used in tongue 12 of gasket 10 or at least made of a softer material than substrate 14, preferably a material having the same durometer hardness as that of the annular tongue 12. Alternately, ridges 16 may simply be made as part of substrate 14, or a ridge of substrate may form a base for a coating layer of a softer material (not shown in FIG. 2).

Figure 3:
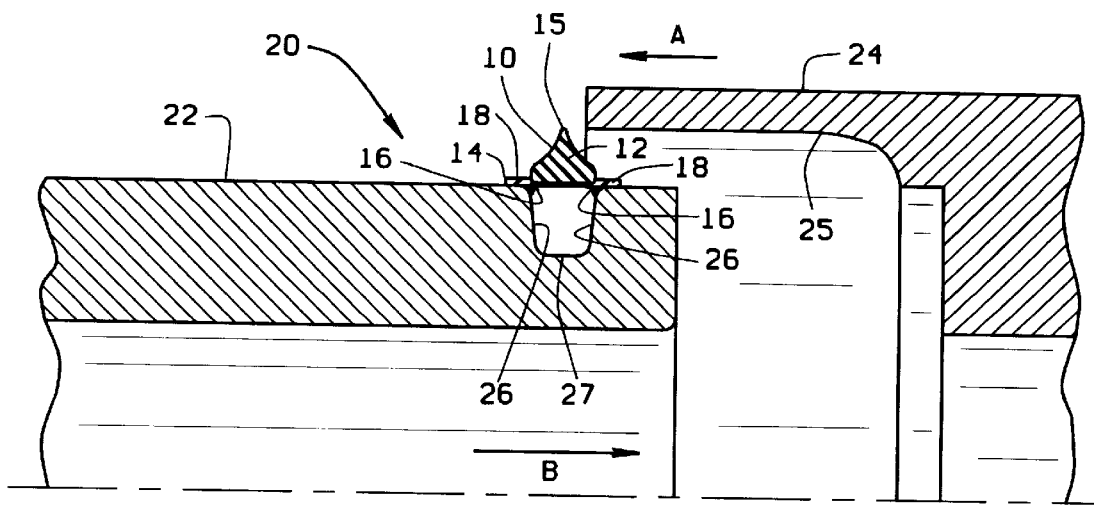
FIG. 3 is a fragmented section view of a recess pipe joint (prior to its assembly) in accordance with this invention using the gasket of FIGS. 1 and 2.

The purpose of the substrate 14, the thickening regions 18, and annular ridges 16 will now be seen in conjunction with FIG. 3, which is an illustration, in cross-section, of a recess pipe joint 20 being formed in which gasket 10 is utilized. Although not shown, it will be understood that an axial center line of the pipes would be positioned below the pipe walls shown in cross section in FIG. 3. A groove 27 in a spigot pipe 22 is provided for retaining gasket 10. Annular ridges 16 on gasket 10, if provided, engage two axially-spaced circumferential walls or shoulders 26, holding the gasket in place through the assembly of the pipe joint, limiting axial movement of gasket 10 relative to male or spigot pipe section 22. Preferably, ridges 16 engage shoulders 26 with soft, compliant material to better avoid leakage out of joint 20 through a groove 27 defined by the two circumferential shoulders 26. However, substrate 14 of gasket 10 is dimensioned to be wide enough to completely span groove 27, so that leakage can be avoided in any event. Female or bell pipe section 24 is joined to male or spigot pipe section 22 as illustrated by arrows A and B so that the bell pipe section 24 circumscribes the spigot pipe section to form joint 20, engaging tip 15 of the softer tongue portion 12 of gasket 10 against wall 25 of bell pipe 24 and compressing tongue 12 to form a seal. The gasket 10 is thus positioned in a manner so that its tongue 12 sealingly encages female or bell pipe section 24 all along the circumference of the tongue and annular ridges 16 (if present) sealingly engage the male or spigot pipe section 22 all around the outer peripheral surface of the male or spigot pipe section 22.

Axial displacement of gasket 10 relative to male or spigot pipe section 22 is limited by engagement of annular ridges 16 with the two spaced-apart shoulders 26 of groove 27. However, unlike prior art joints, substrate 14, by virtue of its hardness and relative incompressibility (preferably aided by stiffening regions 18), substantially prevents gasket 10 from invading groove 27. Thus, rather than filling groove 27 with gasket material, essentially only the volume of material represented by annular ridges 16 (if such are provided) is disposed within groove 27, which otherwise remains essentially void. The harder substrate portion ensures that groove 27 is not filled, because it is hard enough not to collapse into groove 27 and ensures that the gasket bridges the recess formed by the groove. Thus, less gasket material than is required for prior art pipe joints is needed with the pipe joint of FIG. 3.

Figure 4:
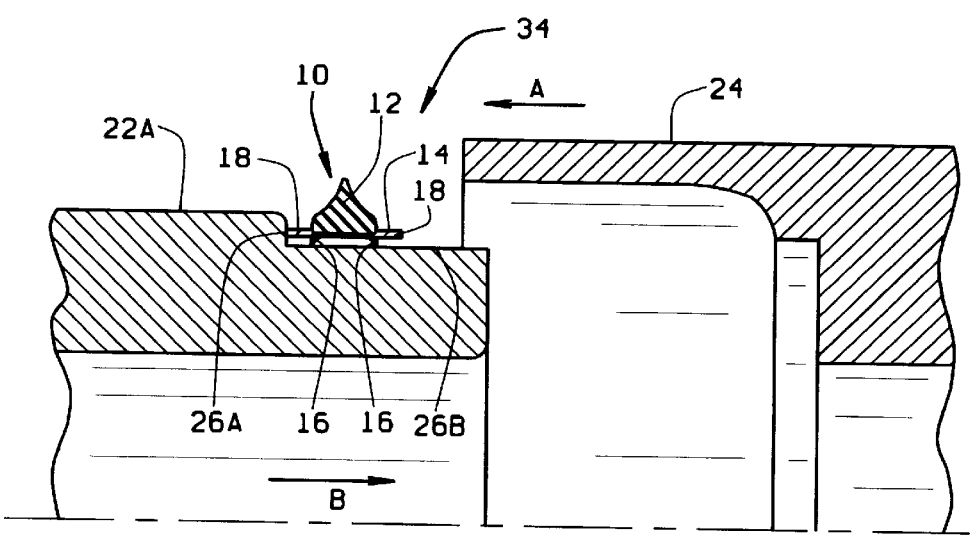
FIG. 4 is a fragmented section view of an alternate embodiment of a single offset pipe joint (prior to its assembly) without a groove, but utilizing the same gasket as the pipe joint of FIG. 3, in accordance with the invention.

Gasket 10 can also be used without modification for sealing a single offset joint, and can thereby reduce the inventory of different types of gaskets needed for different types of pipe joints. FIG. 4 is a cross sectional illustration of a single offset pipe joint 34, with the drawing showing only that portion of the cross section of the pipe joint above a center line of the pipes. In this case, instead of a groove, a single step in spigot pipe 22A is formed, represented by a radially-extending wall 26A and an axially-extending wall 26B. Gasket 10 is held in place by the abutment of a portion of substrate 14 against radially-extending wall 26A. Preferably, ridges 16 of the same (or similar soft) material as tongue 12 of gasket 10 are provided, to provide a sealing engagement with axially-extending wall 26B so as to avoid leakage of material out of the joint 34 between substrate 14 of gasket 10 and axially-extending wall 26B. The joint is made by sliding bell pipe 24 and spigot pipe 22A into engagement with one another as shown by arrows A and B in FIG. 4, which compresses gasket 10 and more particularly, tongue 12, into a sealing engagement with bell pipe 24. It will thus be seen that the same style of gasket 10 may be used (in appropriate sizes) for pipe joints of at least the two types illustrated in FIG. 3 and FIG. 4, and that such gaskets have an advantage of not requiring extra gasket material to fill a void when a groove is provided.

The particular gasket configuration shown in FIGS. 1–2 is suitable for initial placement on a spigot pipe before a joint is formed, because gasket 10 as shown has tongue 12 extending radially outward (with respect to the center of the gasket) from substrate 14. The pipe joint is then made by engaging the bell pipe with the spigot pipe, after the gasket is engaged on the spigot pipe. Although the gasket has been described as being configured for initially seating on the spigot pipe, it is to be understood that the gasket may be configured for initial seating in the bell pipe without departing from the spirit of this invention.

To form a pipe joint in accordance with the invention, a first portion and a second portion of different durometer hardnesses are co-extruded through two separate dies and passed through a third die, effectively joining the materials at an elevated temperature. The joined materials are then chilled. Preferably, the extrusion has a lateral cross-section as shown in FIG. 2. Preferably, the material extruded as the softer, first portion is a thermoplastic elastomer, while the material extruded as the harder, second portion is a harder plastic material, such as polypropylene. Also preferably, the co-extrusion of the substrate includes stiffening portions of substrate disposed generally on opposite sides of the tongue, and ridges or ribs on a side of the substrate opposite the tongue. The ridges are preferably formed of the same softer material as that of the tongue, which may be accomplished by extruding the softer material through an initial die having multiple apertures, including apertures on opposite sides of an aperture through which the substrate material is extruded. The stiffening portions of substrate may also be formed by appropriate shaping of apertures. A strip of gasket material is then formed into an annular gasket (as in FIG. 1) such as by cutting it to a specified length and joining the ends, as by welding. The pipes may then be sealingly engaged with the gasket by placing the gasket on one of the pipes in accordance with the description above, and sliding the ends of the pipes into engagement to form a joint. In a groove-type joint, before joining the pipes together, the gasket is seated on one of the pipes by bridging the gasket with the ridges on the substrate.

Although discussed and illustrated with respect to specific embodiments, the invention is not limited to only the specific embodiments disclosed herein. Many modifications and variations of the inventive gasket and pipe joint will become apparent to those skilled in the art upon reading the above description and review of the accompanying drawings. It will also be observed that some of the advantages of the invention may be realized by embodiments that do not necessarily accomplish every object of the invention. Therefore, the scope of the invention should be determined by reference not only to the specification, but also to the claims below, in conjunction with the full range of equivalents as provided by law. Also, in the claims below, the terms "male" and "female", when used to refer to pipes and pipe sections, are intended to (respectively) include "spigot" and "bell" pipes and pipe sections.

What is claimed is:

1. A pipe joint comprising:
   a first pipe section;
   a second pipe section operatively connected to the first pipe section;
   a gasket sealingly engaging the first pipe section and the second pipe section in a manner for resisting fluid leakage therebetween, the gasket having a first portion of a first durometer hardness and a second portion of a second durometer hardness, the first durometer hardness being less than the second durometer hardness, the first and second portions being formed by co-extrusion, the first portion comprising an annular tongue and the second portion comprising an annular substrate supporting the annular tongue, the annular substrate including an annular inwardly facing surface and an annular outwardly facing surface, the tongue being affixed to and extending radially from the annular outwardly facing surface of the annular substrate, the annular substrate including first and second annular stiffening portions which are stiffer than the first portion and are axially spaced from the tongue.

2. The pipe joint of claim 1 wherein the first portion and the second portion comprise annular rings.

3. The pipe joint of claim 1 wherein the first portion comprises a thermoplastic elastomer and is softer than the second portion.

4. The pipe joint of claim 3 wherein the second portion comprises polypropylene.

5. The pipe joint of claim 3 wherein the thermoplastic elastomer has a durometer hardness of about 40 to 60 Shore A.

6. The pipe joint of claim 1 wherein the gasket further includes first and second annular ridges extending radially inwardly from the inwardly facing surface of the substrate, the first annular ridge being axially spaced from the second annular ridge.

7. The pipe joint of claim 6 wherein the annular ridges have a durometer hardness substantially the same as that of the annular tongue.

8. The pipe joint of claim 7 wherein the first pipe section comprises a female pipe section and the second pipe section comprises a male pipe section positioned in the female pipe section in a manner so that the female pipe section circumscribes the male pipe section, the male pipe section having an outer peripheral surface, the gasket being positioned between the male and female pipe sections in a manner so that the tongue sealingly engages the female pipe section all along the circumference of the tongue and so that the annular ridges sealingly engage the male pipe section all around the outer peripheral surface of the male pipe section.

9. The pipe joint of claim 8 wherein the male pipe section includes first and second circumferential shoulders around the outer peripheral surface, the first circumferential shoulder being axially spaced from the second circumferential shoulder, the first and second annular ridges of the gasket being engageable with the first and second circumferential shoulders of the male pipe section in a manner for limiting axial movement of the gasket relative to the male pipe section.

10. The pipe joint of claim 9 wherein the male pipe section further includes a circumferential groove, the circumferential groove defining the first and second circumferential shoulders.

11. The pipe joint of claim 8 wherein the ridges are of a thermoplastic elastomer.

12. The pipe joint of claim 1 wherein the joint is a recess joint.

13. The pipe joint of claim 1 wherein the joint is a single offset joint.

14. A pipe joint as set forth in claim 1 wherein the first and second stiffening portions are stiffer than the rest of the substrate.

15. A method of sealing a pipe joint, the pipe joint comprising a first pipe section and a second pipe section, the method comprising:
co-extruding a first material and a second material to form a co-extrusion having a first portion of a first durometer hardness and a second portion of a second durometer hardness, the first portion comprising a tongue, the second portion comprising a substrate including stiffening portions which are stiffer than the first portion and are disposed generally on opposite sides of the tongue, the second durometer hardness being greater than the first durometer hardness;
forming a gasket of the co-extrusion; and
sealingly engaging the pipes with the gasket.

16. The method of claim 15 wherein the co-extrusion step comprises co-extruding a thermoplastic elastomer as the first material, the thermoplastic elastomer being softer than the second material.

17. The method of claim 16 wherein the co-extrusion step comprises co-extruding polypropylene as the second material.

18. The method of claim 15 wherein the co-extrusion step comprises co-extruding a plurality of ridges on a side of the substrate opposite to that of the tongue, the method further comprising engaging the ridges with shoulders defining a groove in one of the first pipe section and the second pipe section without filling the groove to thereby limit axial displacement of the gasket.

19. A method of sealing a pipe joint, the pipe joint comprising a first pipe section and a second pipe section, the method comprising:
co-extruding a first material and a second material to form a co-extrusion having a first portion of a first durometer hardness and a second portion of a second durometer hardness, the first portion comprising a tongue, the second portion comprising a substrate, the second durometer hardness being greater than the first durometer hardness;
forming a gasket of the co-extrusion; and
sealingly engaging the pipes with the gasket:
the co-extrusion step comprising co-extruding a plurality of ridges on a side of the substrate opposite to that of the tongue, the method further comprising engaging the ridges with shoulders defining a groove in one of the first pipe section and the second pipe section without filling the groove to thereby limit axial displacement of the gasket.

20. The method of claim 19 wherein in the co-extrusion step the ridges are extruded of the softer, first material.

21. A pipe joint comprising:
a first pipe section having a bell, the bell including a bell seat region;
a second pipe section having a spigot, the spigot being adapted for insertion into the bell of the first pipe section, the spigot including a spigot seat region;
a gasket having a bell-engageable portion, a spigot-engageable portion, and a generally stiff substrate, the substrate having a first durometer hardness, the bell-engageable portion having a durometer hardness less than the first durometer hardness, the spigot-engageable portion having a durometer hardness less than the first durometer hardness, the bell-engageable portion, spigot-engageable portion, and substrate being formed by co-extrusion, the substrate being of a first elastomer and the bell-engageable portion and the spigot-engageable portion being of a second elastomer, the second elastomer being a thermoplastic elastomer, the substrate including at least one annular stiffening portion which is stiffer than the bell-engageable portion and the spigot-engageable portion and is axially spaced from the bell-engageable portion;
the spigot-engageable portion of the gasket being in engagement with and surrounding the spigot seat region, the bell-engageable portion of the gasket being in engagement with and surrounded by the bell seat region.

22. A pipe joint as set forth in claim 21 wherein the bell-engageable portion and the spigot-engageable portion are both of a second durometer hardness.

23. A pipe joint as set forth in claim 21 wherein the bell-engageable portion and the spigot-engageable portion are separate parts of the gasket.

* * * * *